(12) United States Patent
Kudo et al.

(10) Patent No.: US 9,513,141 B2
(45) Date of Patent: Dec. 6, 2016

(54) ELECTRIC POWER MEASUREMENT SYSTEM, ELECTRIC POWER MEASUREMENT METHOD, AND INFORMATION PROCESSING DEVICE

(75) Inventors: Koji Kudo, Tokyo (JP); Yukiko Morioka, Tokyo (JP); Hiroo Hongo, Tokyo (JP); Hisato Sakuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1221 days.

(21) Appl. No.: 13/513,584

(22) PCT Filed: Oct. 15, 2010

(86) PCT No.: PCT/JP2010/068149
§ 371 (c)(1),
(2), (4) Date: Jun. 4, 2012

(87) PCT Pub. No.: WO2011/067988
PCT Pub. Date: Jun. 9, 2011

(65) Prior Publication Data
US 2012/0290232 A1    Nov. 15, 2012

(30) Foreign Application Priority Data

Dec. 2, 2009  (JP) ................. 2009-274607
Mar. 10, 2010 (JP) ................. 2010-053117

(51) Int. Cl.
*G01D 4/00*   (2006.01)
*H02J 13/00*  (2006.01)

(52) U.S. Cl.
CPC .............. *G01D 4/004* (2013.01); *G01D 4/002* (2013.01); *H02J 13/0006* (2013.01);
(Continued)

(58) Field of Classification Search
CPC ...................................... G01D 4/002
See application file for complete search history.

(56) References Cited

U.S. PATENT DOCUMENTS 4,864,512 A    9/1989  Coulson et al.
7,133,568 B2  11/2006  Nikitin et al.
(Continued)

FOREIGN PATENT DOCUMENTS

JP    2000-292465    10/2000
JP    2001-330630    11/2001
(Continued)

OTHER PUBLICATIONS

Supplementary European Search Report dated Jul. 2, 2014 in corresponding European Patent Application No. 10834441.7.
(Continued)

*Primary Examiner* — Manuel Rivera Vargas
(74) *Attorney, Agent, or Firm* — Young & Thompson

(57) ABSTRACT

An electric device has an electric power measurement unit with an electric power detection element measuring consumed electric power and an information communication element transmitting the measured power. An electric power meter has an information communication element measuring and transmitting total electric power consumed indoors. An information processing unit stores the measured values in every predetermined sampling period. If a difference α of two measurement values of the electric power detection element is a finite value, the information processing unit calculates and stores both a difference β of two measurement values of the electric power meter corresponding to the two measurement values and β/α, and calibrates the amount of electric power consumed by the electric device and that is measured by the electric power detection element using a median of values of β/α obtained in a predetermined mea-
(Continued)

surement period or a median of a predetermined number of values of $\beta/\alpha$.

23 Claims, 7 Drawing Sheets

(52) U.S. Cl.
CPC ......... *Y02B 70/3266* (2013.01); *Y02B 90/242* (2013.01); *Y02B 90/246* (2013.01); *Y04S 20/242* (2013.01); *Y04S 20/322* (2013.01); *Y04S 20/42* (2013.01)

(56) References Cited

U.S. PATENT DOCUMENTS

| | | | |
|---|---|---|---|
| 7,242,808 | B2 | 7/2007 | Nikitin et al. |
| 2003/0078797 | A1* | 4/2003 | Kanbara ............... G06Q 30/00 705/412 |
| 2004/0220702 | A1 | 11/2004 | Matsubara et al. |
| 2005/0222784 | A1 | 10/2005 | Tuff et al. |
| 2007/0035290 | A1* | 2/2007 | Schweigert ......... H02M 5/4585 324/142 |
| 2007/0078612 | A1 | 4/2007 | Brendler et al. |

FOREIGN PATENT DOCUMENTS

| | | |
|---|---|---|
| JP | 2003-264880 | 9/2003 |
| JP | 2004-280618 | 10/2004 |
| JP | 2005-032235 | 2/2005 |
| JP | 2005-250523 | 9/2005 |
| JP | 2008-089435 | 4/2008 |
| JP | 2008-236680 | 10/2008 |
| JP | 2009-159732 | 7/2009 |
| WO | WO 03/025512 | 3/2003 |

OTHER PUBLICATIONS

George W. Hart, Nonintrusive Appliance Load Monitoring, Proceedings of the IEEE, vol. 80, No. 12, Dec. 1992.

Leslie K. Norford and Steven B. Leeb, Non-intrusive Electrical Load Monitoring in Commercial Buildings Based on Steady-state and Transient Load-detection Algorithms, Energy and Buildings 24 (1996) pp. 51-64.

* cited by examiner

ELECTRIC POWER MEASUREMENT SYSTEM, ELECTRIC POWER MEASUREMENT METHOD, AND INFORMATION PROCESSING DEVICE

TECHNICAL FIELD

The present invention relates to an electric power measurement system, an electric power measurement method, and an information processing device that separately measure electric power consumption of various types of electric devices that are used in a house.

BACKGROUND ART

In recent years, global warming issues have created much debate. Central governments, companies, and consumers are recognizing the importance of the environment and the movement to reduce $CO_2$ gas emission is becoming stronger in its advocacy against increased energy consumption. In addition, policies to promote the generation of low amounts of carbon in the environment, such as eco-point awarding systems that promote the replacement of high energy consumption units with energy saving units, and anti-global warming tax are being implemented. Moreover, in the future, conversion of actual electric power consumption into economic values, such as eco-points that are awarded based upon the difference in the amount of power consumed by products, and the imposition of a carbon tax on poor energy efficient devices may be implemented not only at the time of product purchase, but also when the product is being used.

It is important to accelerate the reduction of the electric power consumption especially for electric devices that consume large amounts of electric power such as air conditioners, refrigerators, large TV receivers (hereinafter abbreviated as TVs), and IH (Induction Heating) cooking heaters. If consumers, employers and so forth are able to easily check the amount of electric power that such electric devices consume, the expectation is that these units will save energy while operating and save energy throughout their product lifecycle.

However, in order to measure the amount of electric power that is consumed by electric devices so that this can be accurately billed of converted into economic values, these electric devices need to be measured by government certified electric power meters in accordance with the Measurement Law of Japan. In addition, in order to find out the result that measures the amount of electric power that has been consumed, the user needs to check the utility bill that has been sent from the power company of needs to obtain this information on the company's website.

Of course, the amount of electric power consumed by individual electric devices may be measured by government certified electric power meters in accordance with the Measurement Law. However, if such electric power meters are provided to individual electric devices, since the size of the electric devices are large and the cost of the electric devices rises, it is difficult to use such electric power meters. Even if such electric power meters are used, it is difficult to know the measurement results of individual electric power meters easily in real time.

However, thus far, many techniques that measure electrical power consumption of devices that are used in households, but that cannot convert the measurements into economic values, have been proposed. These electric power measurement techniques according to the related art can be roughly categorized into two groups.

(1) Non-intrusive technique: Current sensors or electric power sensors are provided at branch circuits or the like of a home distribution switchboard. The total amount of electric power consumed by electric devices connected to the branch circuits is measured corresponding to the measurement data of the sensors (for example, refer to Patent Literature 1).

(2) Intrusive technique: A current sensor or electric power sensor is directly installed in an electric device or placed between the plug of the electric device and a power outlet (if a clump type sensor is used, the power cable is clumped by the sensor) so as to measure the amount of electric power consumed by each electric device (for example, refer to Patent Literature 2).

Patent Literature 1 presents a technique in which storage means stores power factor information and rated voltage information of individual electric devices, current sensors are provided at individual branch circuits of the distribution switchboard, and the amount of electric power consumed at each branch circuit is estimated corresponding to information of the current sensors and information of individual electric devices connected to the branch circuits provided with the current sensors. Patent Literature 2 presents a technique in which individual electric devices are provided with unit adaptors that obtain the amount of electric power that is consumed and unit information of the individual electric devices.

As described above, the electric power measurement systems, according to the related art, cannot accurately convert power consumption measurements into economic values, unlike government certified electric power meters that measure the amount of electric power consumed by individual electric devices according to the Measurement Law. Thus, the problem exists in which measurement accuracies based upon these techniques are poor.

Even if electric power meters that are government certified according to the Measurement Law are provided to individual electric devices, it is difficult to easily know the amount of electric power that is consumed by each electric device in real time.

In addition, it is difficult to know the amount of electric power generated by electric power generators such as solar batteries and charging/discharging power of secondary batteries that are being implemented to achieve a low carbon emission environment.

In other words, there is a problem in which the electric power measurement systems according to the related art cannot easily measure electric power such as the amount of electric power consumed by electric devices, the amount of electric power that is generated, and the amount of electric power used to charge/discharge various types of electric devices by individual users in real time and to accurately convert these measurements into economic values.

RELATED ART LITERATURE

Patent Literature

Patent Literature 1: Japanese Patent Laid-Open No. 2008-089435;

Patent Literature 2: Japanese Patent Laid-Open No.2005-032235.

SUMMARY

Therefore, an object of the present invention is to provide an electric power measurement system, an electric power measurement method, and an information processing device that can easily measure the amount of electric power consumed by individual electric devices in real time and accurately convert these measurements into economic values.

To accomplish the foregoing object, an electric power measurement system according to an exemplary aspect of the present invention comprises:

an electric device provided with an electric power measurement unit that has electric power detection means that measures the amount of consumed electric power and information communication means that transmits a measurement value of the electric power detection means;

an electric power meter that has information communication means that measures total amount of electric power consumed indoors and transmits the measurement value; and an electric power information processing unit that stores the measurement value measured by the electric power detection means and transmitted from the electric power measurement unit and the measurement value of the total amount of consumed electric power transmitted from the electric power meter in every predetermined sampling period, if a difference α of two measurement values of the electric power detection means is a finite value, calculates and stores both a difference β of two measurement values of the electric power meter corresponding to the two measurement values and β/α, and calibrates the amount of electric power that is consumed by the electric device and that is measured by the electric power detection means using a median of a plurality of values of β/α obtained in a predetermined measurement period or a median of a predetermined number of values of β/α.

In addition, an electric power measurement method according to an exemplary aspect of the present invention comprises:

providing an electric device, that is a target whose electric power consumption is to be measured, with an electric power measurement unit that has electric power detection means that measures the amount of electric power consumed by the electric device and information communication means that transmits a measurement value of the electric power detection means;

providing an electric power meter that measures a total amount of electric power consumed indoors with information communication means that transmits the measurement value; and causing a computer to store the measurement value measured by the electric power detection means and transmitted from the electric power measurement unit and the measurement value of the total amount of consumed electric power transmitted from the electric power meter in every predetermined sampling period, if a difference α of two measurement values of the electric power detection means is a finite value, calculate and store both a difference β of two measurement values of the electric power meter corresponding to the two measurement values and β/α, and calibrate the amount of electric power that is consumed by the electric device and that is measured by the electric power detection means using a median of a plurality of values of β/α obtained in a predetermined measurement period or a median of a predetermined number of values of β/α.

In addition, an information processing device according to an exemplary aspect of the present invention is an information processing device that calibrates a measurement value transmitted from an electric device having an electric power measurement unit that includes electric power detection means that measures the amount of consumed electric power and information communication means that transmits the measurement value of the electric power detection means, comprising:

information communication means that receives the measurement value measured by the electric power detection means and transmitted from the electric power measurement unit and the measurement value of total amount of electric power consumed indoors, measured in a predetermined accuracy by an electric power meter, and transmitted therefrom;

a processing unit that obtains the measurement value measured by the electric power detection means and the measurement value measured by the electric power meter in every predetermined sampling period, if a difference α of two measurement values of the electric power detection means is a finite value, calculates both a difference β of two measurement values of the electric power meter corresponding to the two measurement values and β/α, and calibrates the amount of electric power that is consumed by the electric device and that is measured by the electric power detection means using a median of a plurality of values of β/α obtained in a predetermined measurement period or a median of a predetermined number of values of β/α; and a storage unit that stores both the measurement value measured by the electric power detection means and obtained in every the sampling period and the measurement value of the electric power meter and also stores the value of β/α.

EXEMPLARY EMBODIMENT

Next, with reference to the accompanying drawings, the present invention will be described.

In an electric power measurement system according to the present invention, each electric device located indoors as a target whose electric power consumption is to be measured has an electric power sensor. Using the measurement value of the electric power sensor and the measurement value (the total amount of electric power consumed indoors) of an electric power meter that is government certified according to the Measurement Law of Japan and that is located outdoors, a calibration coefficient γ of the individual electric power sensor is obtained so as to calibrate the measurement values of the electric power sensor of the electric device. By calibrating the measurement value of the amount of electric power consumed by the electric device using the calibration coefficient γ of the individual electric power sensor, the amount of electric power consumed by the electric device located indoors is detected with high accuracy and that measurement can be converted into an economic value.

(First Embodiment)

Figure 1:
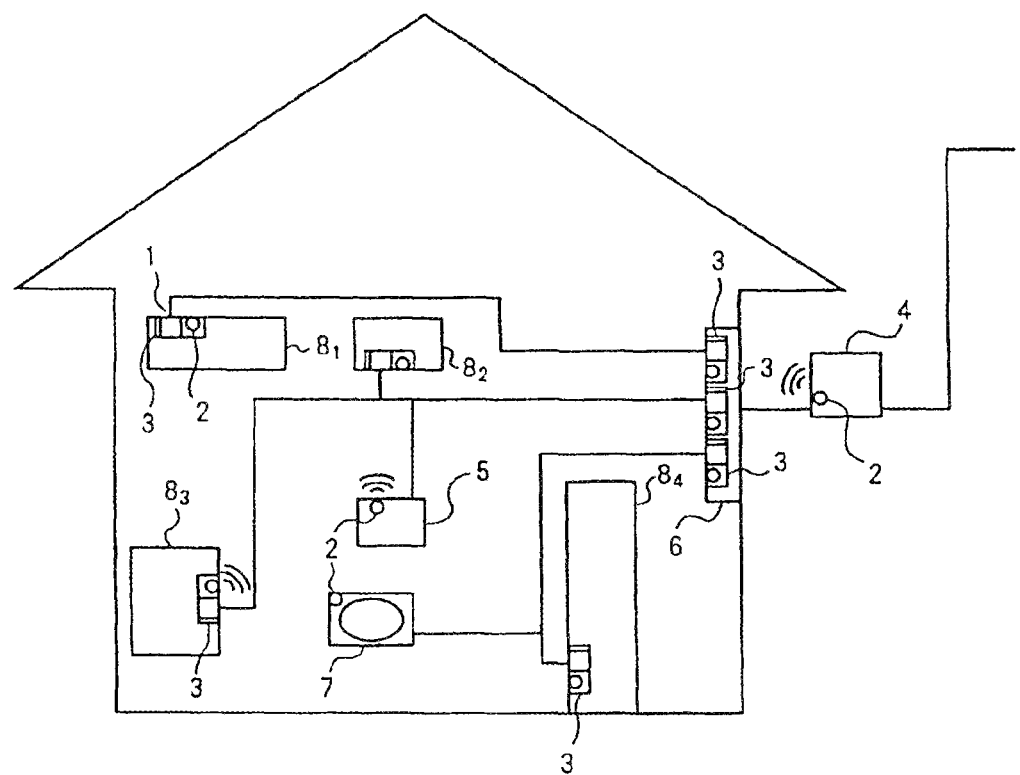
FIG. 1 is a block diagram showing an example of a structure of an electric power measurement system according to a first embodiment.

FIG. 1 is a block diagram showing an example of the structure of an electric power measurement system according to a first embodiment.

As shown in FIG. 1, the electric power measurement system according to the first embodiment has electric power meter 4 located outdoors, electric power information processing unit 5 located indoors, electric power distribution unit 6 located indoors, electric power display unit 7 located indoors, and a plurality of electric devices 8 ($8_1$ to $8_4$ in FIG. 1) located indoors.

Electric devices 8 are electric devices that consume relatively large amounts of electric power as targets whose electric power consumption is to be measured and that are, for example, an air conditioner, a microwave oven, a TV, a refrigerator, a washer, an IH cocking heater, a heat pump water heater, a floor heating unit, and a large lighting unit. A car battery that can be charged from a home electric power outlet or the like can be considered as electric device 8 as a target whose electric power consumption is to be measured. Electric device 8 is provided with electric power measurement unit 3 that has electric power detection means 1 that measures that amount of electric power that it consumes and information communication means 2 that transmits a measurement value of electric power detection means 1 to electric power information processing unit 5. Electric power detection means 1 is, for example, a known electronic type electric power sensor that is provided with a current transformer and a voltage transformer. Information communication means 2 is, for example, a Zigbee radio terminal that uses for example a 950 MHz band radio frequency.

Electric power meter 4 is an electric power meter that is government certified according to the Measurement Law and is located outdoors so as to measure the total amount of electric power that is consumed indoors by the electric power measurement system according to this embodiment. Like electric device 8, electric power meter 4 is provided with information communication means 2 that transmits a measurement value of the total amount of consumed electric power to electric power information processing unit 5. If the radio communication environment is poor both outdoors and indoors, information communication means 2 of electric power meter 4 may be a PLC (Power Line Communication) terminal or the like that uses wired communication. In this case, electric power information processing unit 5 needs to have a PLC terminal.

According to this embodiment, since it is assumed that the electric power measurement system shown in FIG. 1 is used in Japan, electric power meter 4 is a government certified electric power meter that accurately measures the total amount of electric power consumed indoors according to the Measurement Law. Thus, if the electric power measurement system according to this embodiment is used outside Japan, electric power meter 4 may be an electric power meter that accurately measures the total amount of electric power consumed indoors, the meter being government certified according an applied law or standard of that country or that meter having an accurate measurement that can be converted into an economic value designated by a relevant power company or the like. For example, if the electric power measurement system according to this embodiment is used in the United States, electric power meter 4 may be a smart meter or the like installed by a US utility company.

Electric power distribution unit 6 is a distribution switchboard that distributes electric power supplied for example from a power company to the house and has electric power measurement units 3 corresponding to individual branch circuits.

Electric power display unit 7 is a display unit that is provided with information communication means 2 that transmits and receives information to and from electric power information processing unit 5 and is also used for example as an intercom. Electric power display unit 7 displays the amount of consumed electric power or the like of each electric device 8 transmitted from electric power information processing unit 5. Electric power display unit 7 may be any display unit as long as it is provided with information communication means 2. Examples of electric power display unit 7 include display units for a TV, a mobile phone, a personal computer, and so forth and a power generation monitor display unit for a solar battery. However, as will be described later, it is preferred that the measurement value of electric power meter 4 does not contain the amount of electric power consumed by electric power display unit 7 so as to further improve the accuracy of the calibration coefficient γ of electric device 8. To do this, electric power display unit 7 needs to be a mobile phone or a portable terminal unit (personal computer) that operates with a battery.

Electric power information processing unit 5 is provided with information communication means 2 that mutually transmits and receives information to and from electric power meter 4, electric power distribution unit 6, electric power display unit 7, and electric devices 8.

Electric power information processing unit 5 collects and stores the measurement values (the amount of consumed electric power) measured by electric power detection means 1 and transmitted from electric power distribution unit 6, electric power display unit 7, and electric device 8 and the measurement value (the total amount of electric power consumed indoors) transmitted from electric power meter 4 at a predetermined timing, obtains the calibration coefficient γ for the measurement values of electric power detection means 1 using the measurement values, and calculates the amount of electric power consumed by each electric device 8 using the calibration coefficient γ. The amount of electric power consumed by each electric device 8 that has been calculated is transmitted to and displayed on electric power display unit 7 for example through information communication means 2.

Figure 2:
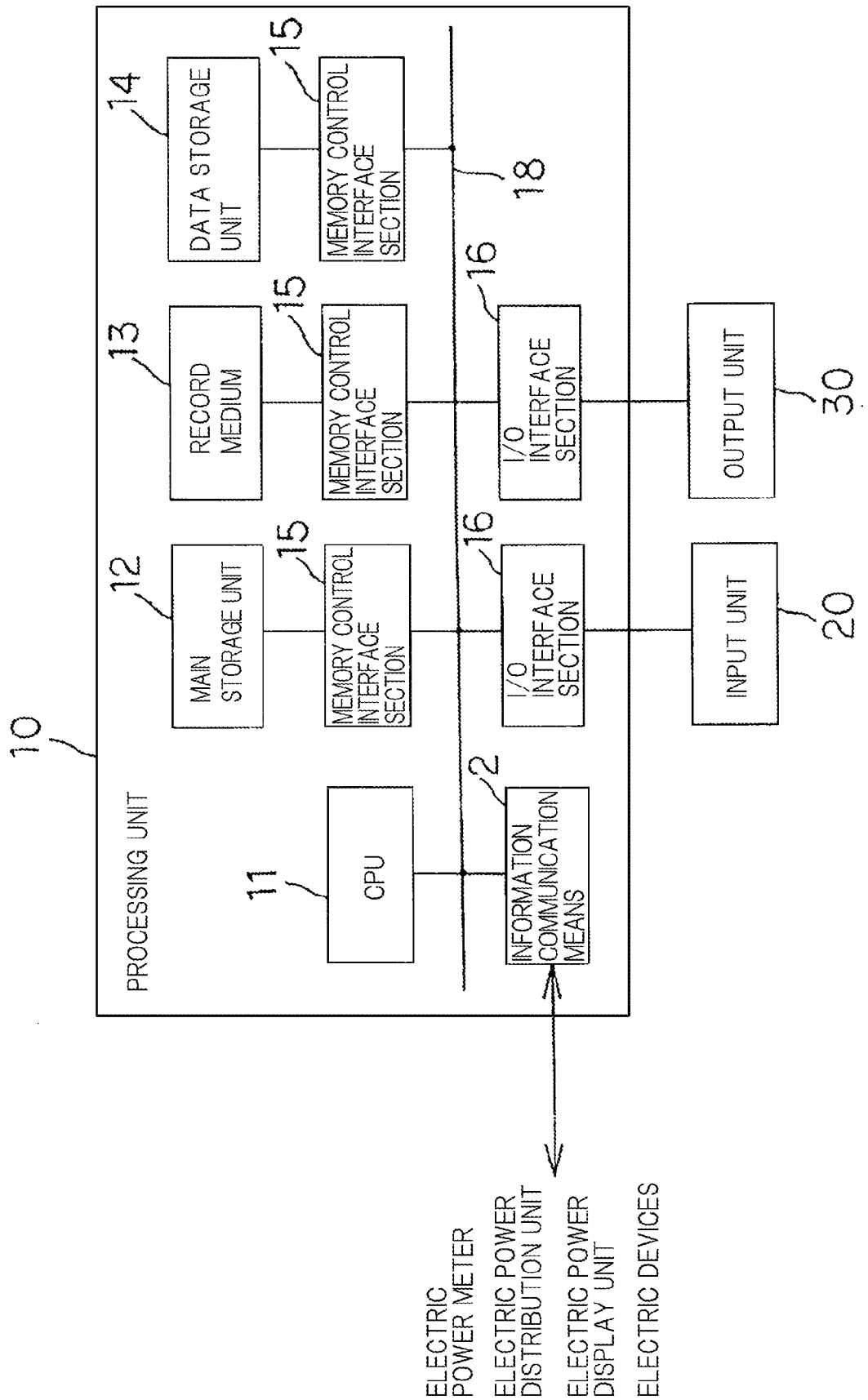
FIG. 2 is a block diagram showing an example of a structure of an electric power information processing device shown in FIG. 1.

Electric power information processing unit 5 can be realized by a computer as shown in FIG. 2.

FIG. 2 is a block diagram showing an example of a structure of the electric power information processing unit shown in FIG. 1.

The computer shown in FIG. 2 is provided with processing unit 10 that executes a predetermined process according to a program, input unit 20 that inputs a command, information, and so forth to processing unit 10, and output unit 30 that outputs the processed result of processing unit 10.

Processing unit 10 is provided with CPU 11, main storage unit 12 that temporarily stores information that CPU 11 needs, record medium 13 that records a program that causes CPU 11 to execute processes of the present invention, data storage unit 14 that stores measurement values (the amount of consumed electric power or the total amount of consumed electric power) transmitted from electric power meter 4, electric power distribution unit 6, and electric devices 8, memory control interface section 15 that controls data transferred from and to main storage unit 12, record medium 13, and data storage unit 14, I/O interface section 16 that is an interface unit that interfaces between input unit 20 and output unit 30, and information communication means 2 that transmits and receives information to and from electric power meter 4, electric power distribution unit 6, electric power display unit 7, and a plurality of electric devices 8. The components of processing unit 10 are connected through bus 18.

Processing unit 10 executes processes according to the program recorded on record medium 13, these processes including a process that obtains the calibration coefficient γ of each electric device 8 (this process will be described later) and a process that calculates the amount of electric power consumed by each electric device 8 using the calibration coefficient γ. Record medium 13 may be a magnetic disc, a semiconductor memory, an optical disc, or another recording medium. Data storage unit 14 does not need to be located in processing unit 10, but can be an independent unit.

According to this embodiment, the measurement value of electric power detection means 1 of each electric device needs to accurately correspond to the measurement value of electric power meter 4. Thus, it is preferred that the measurement timings of electric power detection means 1 and electric power meter 4 synchronize with each other so that the measurement value (the amount of consumed electric power) received from each electric power detection means 1 accurately corresponds to the measurement value (the total amount of consumed electric power) received from electric power meter 4.

Electric power information processing unit 5 is provided with information communication means 2. Electric power information processing unit 5 may be any unit as long it can store the measurement values of electric power detection means 1 and electric power meter 4 and perform a calculation process for the measurement values. For example, electric power information processing unit 5 may be a home gateway, a power generation state monitor unit for a solar battery, or a server unit communicable through a network such as the Internet. However, if electric power information processing unit 5 is a server unit connected to a network, as described above, since the measurement value of electric power meter 4 needs to accurately correspond to the measurement value of electric power detection means 1, these measurement timings need to be matched using a synchronization signal or the like. In addition, as described later, to further improve the accuracy of the calibration coefficient γ of electric device 8, it is preferred that the measurement value of electric power meter 4 not contain the amount of electric power consumed by electric power information processing unit 5. To do that, electric power information processing unit 5 needs to be a portable terminal unit (personal computer) or the like that operates with a battery.

In addition, according to this embodiment, information communication means 2 of each electric device 8 is, for example, a Zigbee radio terminal. Alternatively, as long as information communication means 2 can transmit and receive information, its communication standard, radio frequency, communication speed, and so forth are not restricted. For example, if information communication means 2 uses radio-communication, it may use WiFi (Wireless Fidelity), UWB (Ultra Wide Band), Bluetooth, or the like as well as Zigbee; if information communication means 2 uses wired-communication, it may use Ethernet (registered trademark), PLC, or the like. However, as described later, to further improve the calibration coefficient γ of each electric device 8, it is preferred that the measurement value of electric power meter 4 not contain the amount of electric power that is consumed by electric power measurement unit 3 itself. Thus, it is preferred that information communication means 2 be a Zigbee radio terminal that consumes low electric power and that operates with a battery.

In the electric power measurement system that has such a structure according to this embodiment, electric power information processing unit 5 collects and stores measurement values transmitted from electric power meter 4, electric power distribution unit 6 and each electric device 8 in every predetermined sampling period T and then obtains the calibration coefficient γ for the measurement value of electric power detection means 1 of each electric device 8 by using the obtained measurement values.

For example, if the measurement values (the amount of consumed electric power) of electric power detection means 1 of a plurality of electric devices (x units, where x is any positive integer) as targets whose electric power consumption is to be measured at any time are denoted by Pa,1(x) and the measurement value (the total amount of consumed electric power) of electric power meter 4 corresponding thereto is denoted by Ps,1, it can be expressed by formula (1) that follows.

$$Ps,1 = \Sigma_x \gamma(x)\, Pa,1(x) + Pb \quad (1)$$

where Pb represents the amount of electric power consumed by electric devices such as a lighting unit and a built-in electric device that are not targets whose electric power consumption is to be measured and γ(x) represent calibration coefficients of measurement values Pa1(x) of electric devices (x).

If the amount of electric power consumed by a particular electric device (x=3) of x electric devices 8 that are electric power measurement targets changes after the elapse of a particular time and if the measurement values (the amount of consumed electric power) of electric power detection means 1 are denoted by Pa,2(x) and the corresponding measurement value (the total amount of consumed electric power) of electric power meter 4 is denoted by Ps,2, it can be expressed by formula (2) as follows:

$$Ps,2 = \Sigma_x \gamma(x)\, Pa,2(x) + Pb \quad (2)$$

where it is assumed that electric devices that are not targets whose electric power consumption is to be measured such as a lighting unit and a built-in type electric are normally operating and the amount of electric power Pb that is consumed does not change.

Thus, when formula (2) is subtracted from formula (1), for example, the calibration coefficient γ(3) of the electric device (x=3) can be obtained as expressed by formula (3) as follows:

$$Ps,2-Ps,1=\gamma(3)\ \{Pa,2(3)-Pa,1(3)\}$$

$$\gamma(3)=(Ps,2-Ps,1)/\{Pa,2(3)-Pa,1(3)\} \quad (3)$$

In other words, by calculating the difference between the measurement value of electric power detection means 1 obtained at any measurement time and the measurement value of electric power detection means 1 obtained at the next measurement time and the difference between the measurement values of electric power meter 4 obtained at their corresponding measurement times, the calibration coefficient γ of each electric device can be obtained.

According to this embodiment, the calibration coefficient γ of electric power detection means 1 of each electric device 8 is obtained based on the foregoing calculation theory and the measurement value of electric power detection means 1 is calibrated using the obtained calibration coefficient γ so as to obtain the amount of electric power consumed by each electric device 8 with an accuracy that can be converted into an economic value.

Thus, electric power information processing unit 5 according to this embodiment obtains and stores the measurement value (the amount of consumed electric power) $A_n$ of each electric device 8 in every predetermined sampling period T and calculates the difference $\alpha(=a_n-a_{n-1})$ between the measurement value at one measurement time and the measurement value at the next measurement time. In addition, electric power information processing unit 5 according to this embodiment obtains and stores the measurement value (the total amount of consumed electric power) by electric power meter 4 in every predetermined sampling period T and calculates the difference $\beta(=A_n-A_{n-1})$ between the measurement value at one measurement time and the measurement value at the next measurement time.

Figure 3:
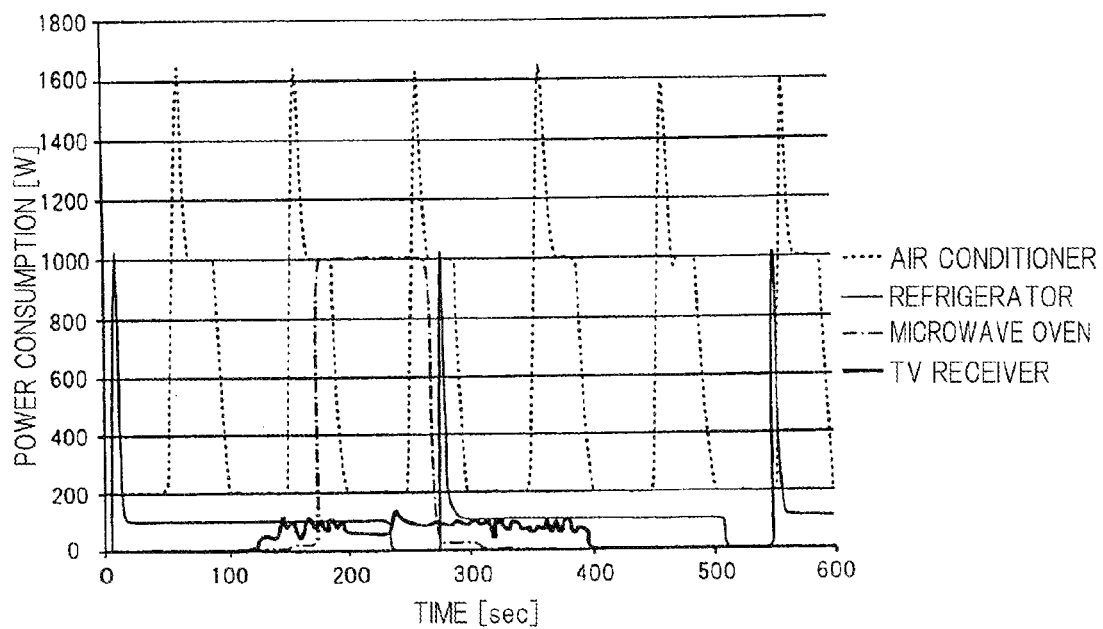
FIG. 3 is a graph showing that the amount of electric power consumed by individual electric devices changes.
Figure 4:
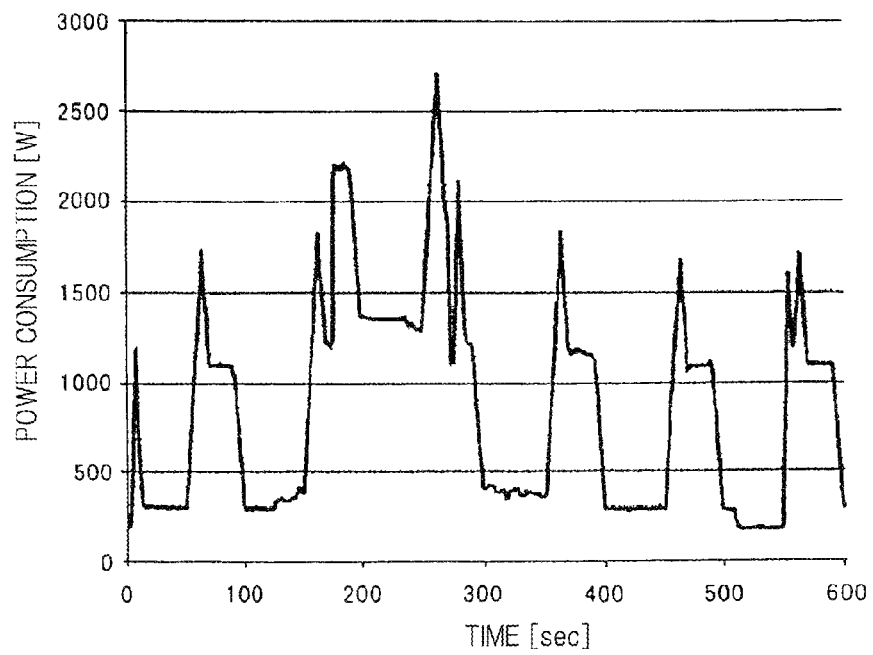
FIG. 4 is a graph showing that a measurement value (the total amount of consumed electric power) of an electric power meter changes as the amount of electric power consumed by the individual electric devices shown in FIG. 3 changes.

FIG. 3 shows that the measurement values (the amount of consumed electric power) of a plurality of electric devices 8 change when measured for ten minutes (600 seconds) in every sampling period T (=1 second). On the other hand, FIG. 4 shows that the measurement value (the total amount of consumed electric power) of electric power meter 4 changes as the measurement value of each electric device shown in FIG. 3 changes. FIG. 3 and FIG. 4 also show that the measurement value of each electric device and the measurement value of electric power meter 4 change when electric devices such as a lighting unit and a built-in type electric device, that are not targets whose electric power consumption is to be measured, are turned off and only an air conditioner, a microwave oven, a TV, and a refrigerator operates.

If the foregoing difference α obtained in every sampling period T is a finite value (not 0), the calibration coefficients γ of electric power detection means 1 of corresponding electric device 8 can be obtained by β/α. However, since a plurality of values of the calibration coefficient γ obtained in the predetermined measurement periods fluctuate, they need to be statistically processed so as to accurately obtain the calibration coefficient γ.

Figure 5A:
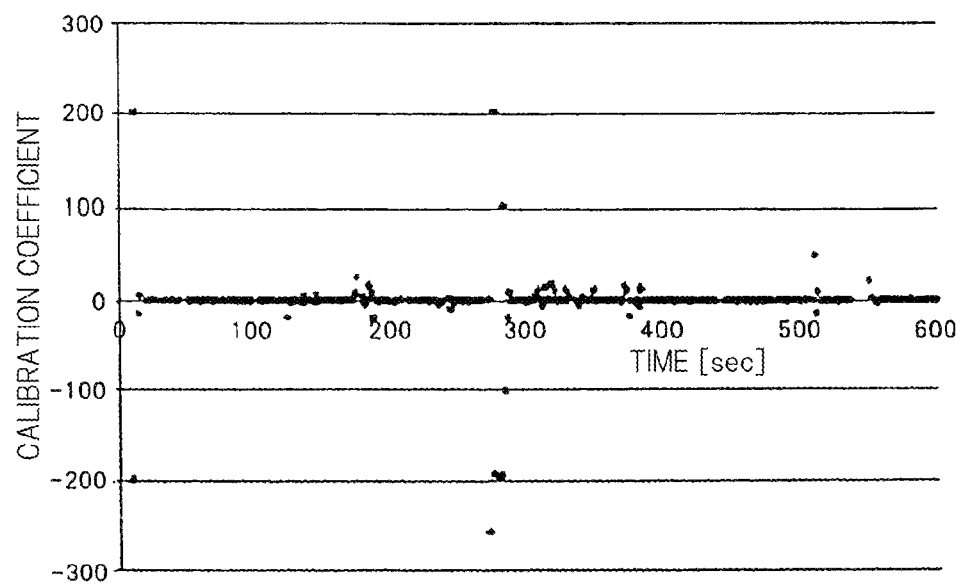
FIG. 5A is a graph showing that a calibration coefficient γ obtained from measurement values of the amount of electric power consumed by an air conditioner shown in FIG. 4 changes.
Figure 5B:
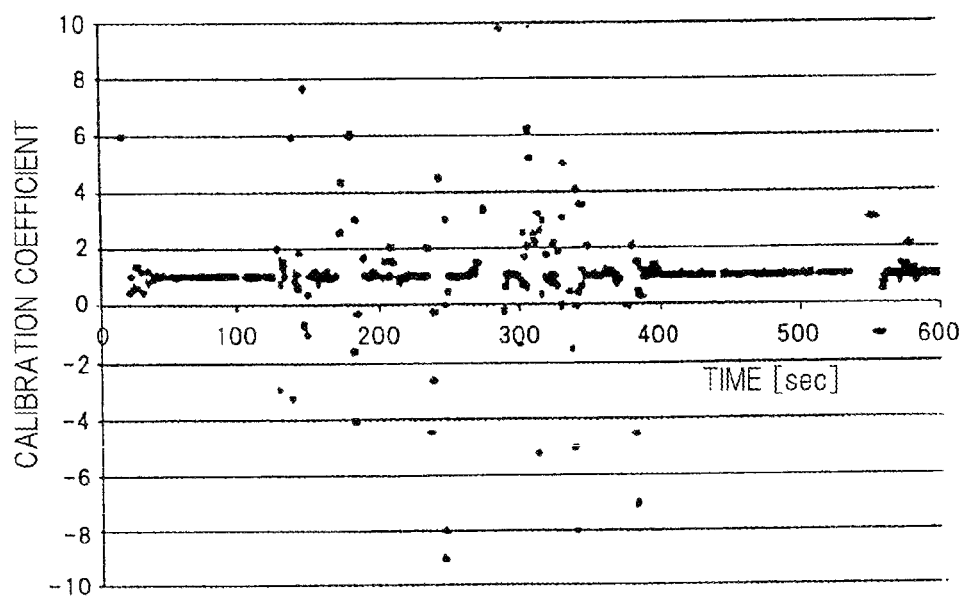
FIG. 5B is a graph showing that a calibration coefficient γ obtained from measurement values of the amount of electric power consumed by the air conditioner shown in FIG. 4 changes.

FIG. 5A shows that the calibration coefficient γ(=β/α) obtained from the measurement value of the amount of electric power consumed by the air conditioner shown in FIG. 4 changes. FIG. 5B also shows that the values on the vertical axis of the graph shown in FIG. 5A are magnified to −10 to +10.

As is clear from FIG. 5A and FIG. 5B, the values of the calibration coefficient γ of electric power detection means 1 of the air conditioner fluctuates around 1.0. This is because since not only the air conditioner, but also other electric devices operate simultaneously, the value of β is disturbed. However, the influence by other electric devices that operate can be reduced if the number of data samples of β/α is sufficiently increased. By obtaining the median (median) of a plurality of values of β/α, the calibration coefficient γ(γ=1.000109704) can be accurately obtained.

Since the amount of electric power consumed by each electric device 8 shown in FIG. 3 is measured by the electric power sensor having excellent linearity, the calibration coefficient γ does not change depending on the amount of consumed electric power that has been measured. However, since such an electric power sensor may not always be used, if the sensitivity of the electric power sensor changes depending on the amount of consumed electric power that has been measured, namely the detection characteristic of electric power detection means 1 that has non-linearity, electric power detection means 1 needs to have a plurality of calibration coefficients $\gamma(a_n)$.

In this case, electric power information processing unit 5 decides a plurality of measurement electric power ranges for calibration coefficients γ(for example, every 1 W), obtains calibration coefficients $\gamma(a_n)$ in the individual measurement electric power ranges, and stores them correlated with the absolute values $(a_n)$ of the measurement values (the amount of consumed electric power). The amount of consumed electric power Z of electric device 8 can be obtained by $Z=\gamma(a_n)\ \Sigma a_n$.

Figure 6:
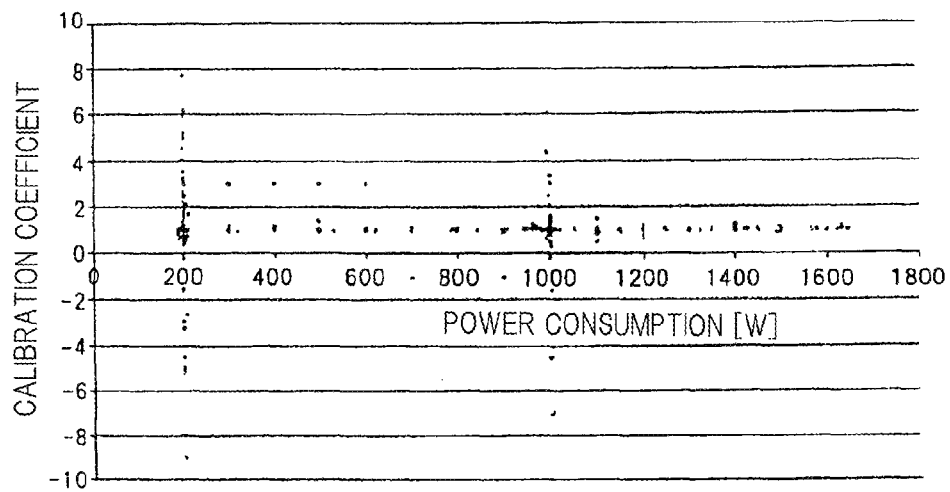
FIG. 6 is a graph showing that a calibration coefficient γ obtained from measurement values of the amount of electric power consumed by the air conditioner shown in FIG. 4 changes corresponding to measurement electric power of electric power detection means.

FIG. 6 shows that the calibration coefficient γ obtained from the measurement value of the amount of electric power consumed by the air conditioner shown in FIG. 4 changes as the measurement electric power of electric power detection means 1 changes.

Generally, the consumed electric power waveform of the air conditioner continues to periodically have similar shapes. Thus, if the calibration coefficients $\gamma(a_n)$ of the amount of consumed electric power are plotted, the number of effective data samples becomes small as is clear from FIG. 6.

However, if a sufficiently long measurement period is designated, effective data samples necessary to obtain the calibration coefficients $\gamma(a_n)$ in a plurality of measurement electric power ranges can be ensured. The measurement period may be decided according to a predetermined policy, for example, a period until the number of calibration coefficients $\gamma(a_n)$ in individual measurement electric power ranges becomes 10000. Since the characteristic of the electric power sensor changes depending on the type, the environment in which the sensor is used, or the electric device that is a target whose electric power consumption is to be measured, the foregoing policy can be decided taking into consideration the change of characteristic of the electric power sensor based on the accuracy required for the calibration coefficients $\gamma(a_n)$. If the individual measurement electric power ranges in which the calibration coefficients $\gamma(a_n)$ are obtained are widely designated, since the number of data samples necessary for the calculation process can be decreased, the burden imposed on the process of electric power information processing unit 5 can be reduced. In this case, electric power information processing unit 5 can be realized by an information processing device that has a relatively low processing capability such as a mobile phone.

In the electric power measurement system according to this embodiment, electric power information processing unit 5 can calculate the amount of consumed electric power Z of each electric device 8 for any useful purpose such as eco-point awarding. However, when the electric power measurement system is initially operated or electric device 8 is newly installed, a measurement period (for example, one month) is necessary to obtain a calibration coefficient γ (or calibration coefficients γ($a_n$)). Thus, in this measurement period, the calibration coefficient γ (or calibration coefficients γ($a_n$)) cannot be accurately obtained. In this case, although the calibration coefficient γ (or calibration coefficients γ($a_n$)) used to calculate the amount of consumed electric power Z can be estimated by interpolating or extrapolating the calculated β/α, the obtained amount of consumed electric power Z is likely to contain an error. Thus, when the electric power measurement system is initially operated or electric device 8 is newly installed, electric power information processing unit 5 causes electric power display unit 7 or the like to display an alarm that denotes that the calibration coefficient γ(or calibration coefficients γ($a_n$)) has not been accurately obtained instead of the amount of electric power consumed by each electric device 8. After the calibration coefficients γ($a_n$) of each electric device 8, that is a target whose electric power consumption is to be measured, have been accurately obtained, the amount of consumed electric power Z can be calculated at desired timings, for example, every month, every day, every hour, or every minute.

In the electric power measurement system according to this embodiment, the calibration coefficients γ($a_n$) obtained according to an appropriate policy are unlikely to largely change in a short time except when secular change or the like occurs. Thus, even if the calibration coefficients γ($a_n$) obtained in every predetermined measurement period differ, as long as the difference is small, it is not necessary to update the calibration coefficients γ($a_n$). However, to more accurately obtain the calibration coefficients γ($a_n$), the average value of the calibration coefficients γ($a_n$) obtained in every predetermined period can be used. If the calibration coefficients γ($a_n$) calculated in a measurement period until the number of data samples becomes 10000 are 1.00323 and the calibration coefficients γ($a_n$) calculated when the number of data samples becomes 10000 are 1.00321, the average value (=1.00322) can be used as the calibration coefficient γ used to calculate the amount of electric power that is consumed.

In contrast, if the calibration coefficients γ($a_n$) largely change in a short period (for example, γ($a_n$))=1.12322), since it is supposed that the electric power sensor may be defective, electric power information processing unit 5 needs to cause electric power display unit 7 or the like to display an alarm or the like that denotes that the electric power sensor is defective.

Figure 7:
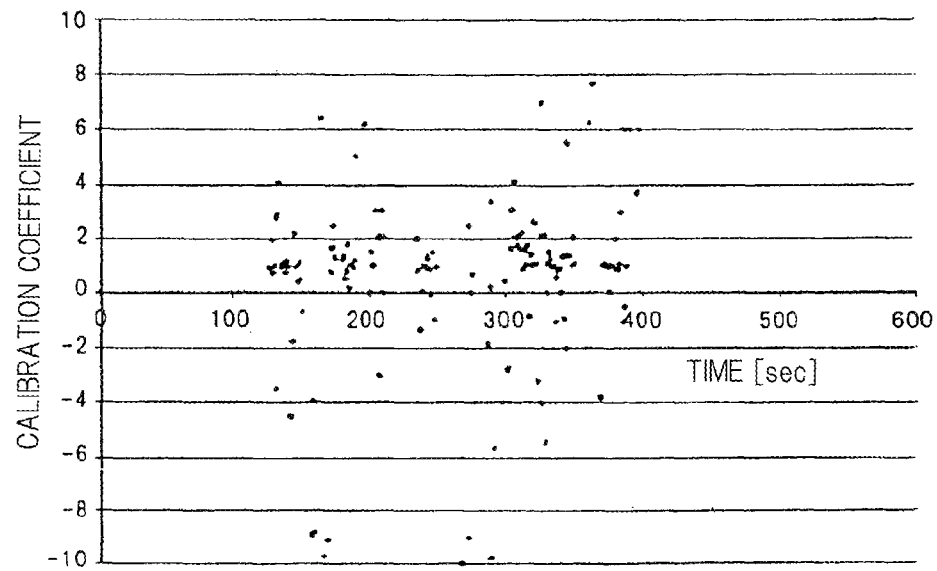
FIG. 7 is a graph showing that a calibration coefficient γ obtained from measurement values of the amount of electric power consumed by a TV shown in FIG. 4 changes.

In the measurement period (600 seconds) shown in FIG. 3, since the amount of electric power consumed by the plurality of electric devices 8, that are targets whose electric power consumption is to be measured, is simultaneously measured, the calibration coefficient γ of an electric device that consumes a relatively low amount of electric power, for example, a TV is easily affected. FIG. 7 shows that the calibration coefficient γ(=β/α) obtained from the measurement value of the amount of electric power consumed by the TV shown in FIG. 4 changes.

As shown in FIG. 7, since the values of the calibration coefficient γ obtained from the measurement values of the amount of electric power consumed by the TV shown in FIG. 4 largely disperse, its median cannot be used as the calibration coefficient γ of electric power detection means 1 of the TV. This is because when the amount of electric power consumed by the TV is measured, a plurality of electric devices (in this example, the air conditioner, the refrigerator, and the microwave over) that consume a large amount of electric power are simultaneously operating as described above.

In such a case, with reference to the measurement results of electric power detection means 1 of other electric devices, the calibration coefficient γ may be obtained using the measurement value of electric power detection means 1 of the electric device that is a target whose electric power consumption is to be measured (in this case, the TV) while the other electric devices are not operating.

Figure 8:
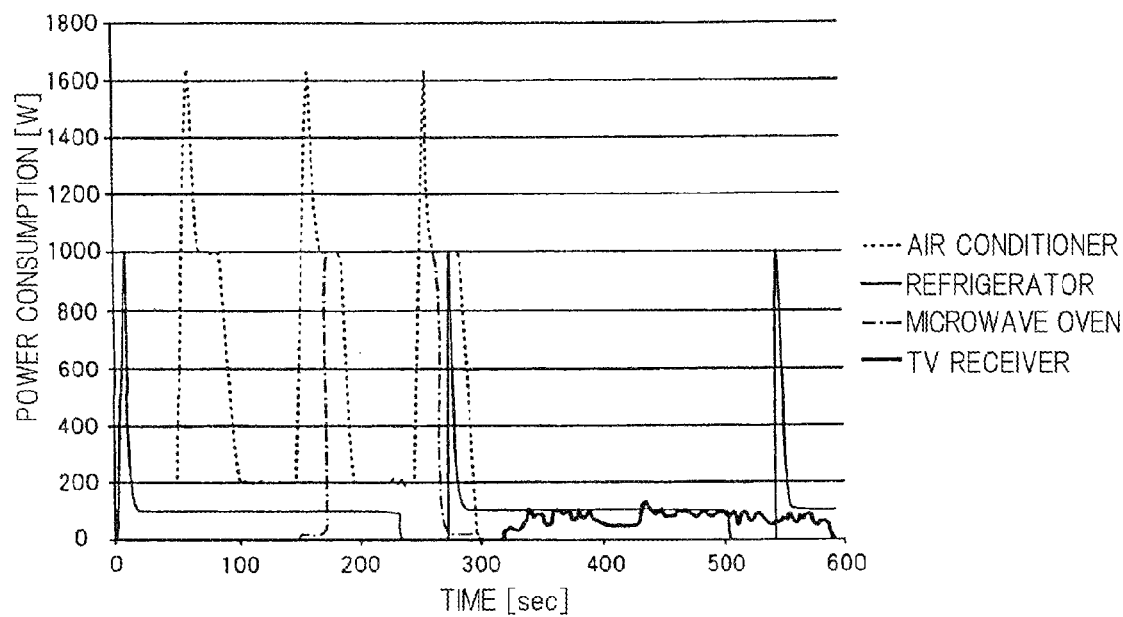
FIG. 8 is a graph showing that the amount of electric power consumed by individual electric devices shown in FIG. 3 changes as their operation timings change.
Figure 9:
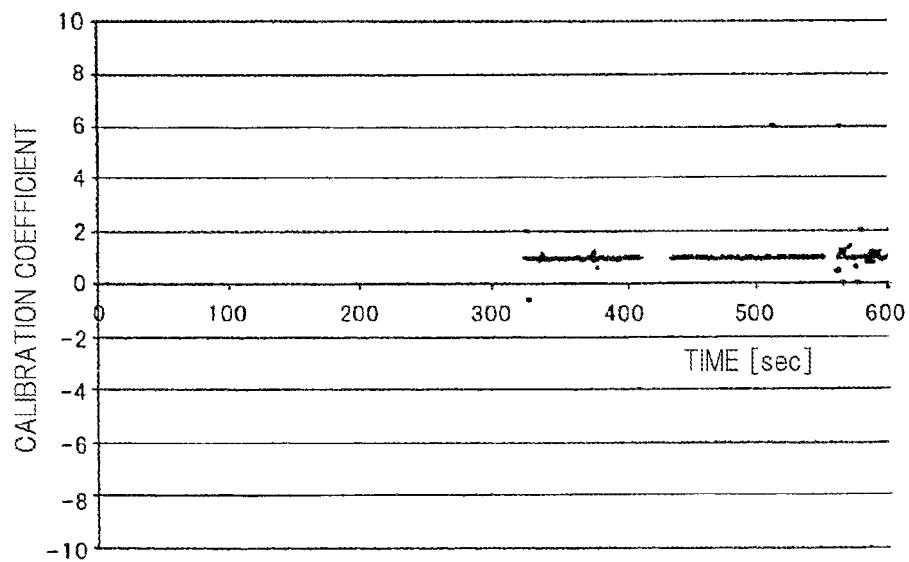
FIG. 9 is a graph showing that a calibration coefficient γ obtained from measurement values of the amount of electric power consumed by the TV shown in FIG. 4 changes.

FIG. 8 shows that the amount of consumed electric power changes as timings of the individual electric devices (the air conditioner, the microwave oven, the TV, and the refrigerator) shown in FIG. 3 change. More specifically, FIG. 8 shows that the measurement value of the amount of consumed electric power changes in the case that after the air conditioner, the microwave oven, and the refrigerator are turned on, the TV is turned off, and five minutes elapse, then the air conditioner is turned off and then the TV is turned on. FIG. 9 shows that the calibration coefficient γ(=β/α) obtained from the measurement value of the amount of electric power consumed by the TV shown in FIG. 7 changes.

Although the graph shown in FIG. 7 denotes that the medians of the calibration coefficients γ are 0.999832426, the graph shown in FIG. 9 denotes that the medians of the calibration coefficients γ are 1.000000000, which are more accurate calibration coefficients γ than the former.

Actual houses also have many other electric devices that receive electric power from electric power distribution unit 6 and that are not electric targets whose electric power consumption is to be measured such as a lighting unit and a built-in type electric device other than electric devices 8 that are targets whose electric power consumption is to be measured. Thus, if the amount of electric power consumed by these electric devices changes, they become a disturbance factor that causes the measurement accuracies of calibration coefficients γ of electric devices 8 to deteriorate.

Thus, to accurately obtain the calibration coefficients γ of electric devices 8, that are targets whose electric consumption is to be measured, it is preferred that the measurement values of electric power detection means 1 and electric power meter 4 be obtained while other electric devices are not operating or while they are operating in a low power consumption mode (for example, they are in the standby state).

As described above, by observing the measurement value of electric power detection means 1, it can be determined whether electric devices 8, that are targets whose electric power consumption is to be measured, and that are provided with electric power measurement unit 3 are not operating or whether they are operating in a low power consumption mode.

In contrast, with respect to an electric device that is not provided with electric power measurement unit 3, a technique that detects the ON/OFF state and the type of the electric device that uses a characteristic change such as harmonics contained in a waveform of the total electric power (hereinafter this characteristic change is referred to as an electric power fingerprint) is known. Thus, the state of each electric device may be determined using such an electric power fingerprint.

Generally, the total amount of electric power that is consumed by electric devices installed indoors changes with a curve that has a region in which a series of large electric power peaks instantaneously occur, a region in which similar waveforms periodically occur, a region in which small vibrations occur, a region in which a gradual curve rather than a straight line occurs, and so forth. They denote that there is an electric device that is controlled to be frequently turned on and off, an electric device that is periodically operated, an electric device that consumes electric power that changes with the characteristic, an electric device that is provided with an inverter or the like, and so forth.

Techniques that determine the state of each electric device using characteristic changes (electric power fingerprint) of waveforms of electric power have been proposed as step techniques that identify electric devices based on step-wise changes and instantaneous large waveforms of electric power by George W. Hart in "Non-intrusive Appliance Monitoring" (IEEE, pp. 1870-1891, 1992) and by Leslie K. Norford in "Non-intrusive electrical load monitoring in commercial building based on steady state and transient load-detection algorithms" (Energy and building 24, pp. 51-46, 1996), respectively.

In addition, techniques that identify operating electric devices and the amount of electric power that they consume based on the relationship between harmonic components contained in measured electric current and operating electric devices have been proposed in Japanese Patent No. 3403368, Japanese Patent No. 3602835, Japanese Patent No. 3877269, and so forth.

If the state of each electric device is determined using such an electric power fingerprint, it can be determined whether each electric device that is not provided with electric power measurement unit 3 is not operating and whether it is operating in a low power consumption mode.

The foregoing description presents an example in which the calibration coefficient γ is calculated in every sampling period T using the differences α and β obtained from the measurement values of electric power detection means 1 in a predetermined measurement period. However, in this case, since the states of many electric devices need to be considered because of the use of the electric power fingerprints or the like, it may be difficult to designate a measurement period necessary to obtain the calibration coefficient γ of each electric device 8 that is a target whose electric power consumption is to be measured.

However, it is not necessary to calculate the differences α and β from the measurement values successively obtained from electric power detection means 1 and electric power meter 4. As long as the difference α is a finite value (not 0), the differences α and β can be calculated using measurement values obtained at any time.

In other words, while the electric devices other than electric devices 8, that are targets whose electric power consumption is to be measured, are not operating or while they are operating in a low power consumption mode, if the difference α of two measurement values ($=a_n-a_{n-1}$) by electric power detection means 1 is a finite value, the corresponding $\beta(=A_n-A_{n-1})$ is calculated and β/α (=calibration coefficient $\gamma_n$ ($a_n$, $t_n$)) is stored. After data samples of β/α are sufficiently obtained, their medians are used as calibration coefficients $\gamma_n$ ($a_n$, $t_n$) to calculate the amount of consumed electric power Z. In this case, the amount of consumed electric power Z can be calculated by $Z=\gamma_n$ ($a_n$, $t_n$)$\Sigma a_n$.

As described above, the electric power measurement system according to this embodiment can accurately obtain the calibration coefficient γ by calculating the difference $\alpha(=a_n-a_{n-1})$ of two measurement values of electric power detection means 1 of electric device 8 and the difference $\beta(=A_n-A_{n-1})$ of two measurement values of electric power meter 4, storing β/α, and obtaining the median of a plurality of values of β/α. Thus, when the measurement value of electric power detection means 1 is calibrated with the calibration coefficient γ, the amount of electric power consumed by each electric device 8 can be obtained with an accuracy that can be converted into an economic value. Since the calibrated amount of electric power that is consumed by each electric device 8 can be used, for example, for awarding eco-points and for imposing taxes, the electric power measurement system can contribute toward anti-global warning.

In addition, since the electric power measurement system according to this embodiment calibrates the measurement value of electric power detection means 1 of each electric device 8 based on the measurement value of electric power meter 4, it is not necessary to use an electric power meter that is government certified according to the Measurement Law.

In addition, since the amount of electric power consumed by each electric device 8 calculated by electric power information processing unit 5 is transmitted from information communication means 2 to electric power display unit 7 that can be also used as an intercom and displayed thereon, the user can conveniently check the amount of electric power consumed by each electric device installed indoors in real time.

(Second Embodiment)

The electric power measurement system according to a second embodiment is the same as the electric power measurement system according to the first embodiment shown in FIG. 1 except that electric power measurement unit 3 of each electric device according to the first embodiment shown in FIG. 1 also has temperature detection means that measures the ambient temperature of the electric device. The temperature detection means may be, for example, a temperature sensor such as a thermistor.

Generally, the electric power sensor used as electric power detection means 1 not only has nonlinearity according to the first embodiment, but also has temperature dependency. The temperature dependency also affects the measurement accuracy of the electric power sensor.

Electric power measurement unit 3 according to the second embodiment measures the amount of electric power consumed by electric device 8 of its own electric power measurement unit, measures the ambient temperature of electric device 8 using temperature detection means, and transmits a measurement value $a_n$ of the amount of electric power that is consumed and a measurement value $T_n$ of the ambient temperature to electric power information processing unit 5 using information communication means 2.

Electric power information processing unit 5 according to this embodiment obtains the measurement value $a_n$ of the amount of electric power consumed by each electric device 8, the measurement value $T_n$ of the ambient temperature, and the measurement value $A_n$ of electric power meter 4 (the total amount of electric power consumed indoors) in every predetermined sampling period (for example, every 2 seconds) and correlatively stores $a_n$, $T_n$, and $A_n$.

Moreover, in electric power information processing unit 5 according to this embodiment, the technique that considers the nonlinearity of electric power detection means 1 according to the first embodiment is applied to the temperature dependency of electric power detection means 1. In other words, electric power information processing unit 5 decides a plurality of measurement electric power ranges and a plurality of measurement temperature ranges for obtaining calibration coefficients (for example, 1 W, ±1K) based on the measurement values of electric power detection means 1 and the temperature detection means, obtains the calibration coefficients $\gamma(a_n, T_n)$ in the measurement electric power ranges and measurement temperature ranges in the same manner as the first embodiment, and stores them correlated with the absolute value of the electric power $(a_n)$ and the ambient temperature $T_n$. The amount of consumed electric power Z of electric devices 8 can be obtained by $Z=\gamma(a_n, T_n) \Sigma a_n$.

In this embodiment, the plurality of measurement temperature ranges for obtaining the calibration coefficients are ±1 K. Alternatively, the measurement temperature ranges for obtaining the calibration coefficients may be properly designated depending on the temperature dependency of electric power detection means 1. If each measurement temperature range for obtaining the calibration coefficients $\gamma(a_n, T_n)$ is widely designated, since the number of data samples can be decreased, the burden imposed on the process of electric power information processing unit 5 can be reduced. In this case, electric power information processing unit 5 can be realized by an information processing device having relatively low processing capability such as a mobile phone. Since the other structures and operations of the electric power measurement system according to the second embodiment are the same as those according to the first embodiment, their description will be omitted.

Since the electric power measurement system according to this embodiment obtains calibration coefficients $\gamma(a_n, T_n)$ in consideration of not only nonlinearity of electric power detection means 1, but temperature dependency thereof, the former can measure the amount of electric power consumed by each electric device with higher accuracy than the first embodiment.

According to the foregoing first embodiment and second embodiment, electric power measurement unit 3 is provided in electric device 8 that is an electric power measurement target. Alternatively, electric power measurement unit 3 may be provided in an electric power outlet, an electric power tap, or the like used indoors. If a plurality of electric devices are connected to a power outlet or a power tap, the types, the states, and so forth of the electric devices can be determined based on the foregoing electric power fingerprints.

In addition, according to the first embodiment and the second embodiment, the measurement value of electric power detection means 1 and the measurement value of electric power meter 4 are obtained in every predetermined sampling period T (every one second or two seconds). Alternatively, the sampling period T may be shorter or longer than those, not limited to one second or two seconds. In addition, timings at which the measurement value of electric power detection means 1 and the measurement value of electric power meter 4 are obtained are not limited to a predetermined period. Alternatively, the measurement values may not be obtained periodically.

As described above, according to the present invention, the measurement value of electric power detection means of each electric device needs to accurately correspond to the measurement value of electric power meter 4. The first embodiment presents the technique that causes electric power information processing unit 5 to synchronize the measurement timings of electric power detection means 1 and electric power meter 4. Alternatively, the measurement timings of electric power detection means 1 and electric power meter 4 may be matched by causing electric power measurement unit 3 of each electric device 8 to communicate with electric power meter 4.

(Third Embodiment)

The foregoing first embodiment and second embodiment present examples in which the amount of electric power consumed by each electric device installed indoors is measured with an accuracy that can be converted into an economic value. An electric power measurement system according to a third embodiment presents an example in which the amount of electric power that is generated by an electric power generator, such as a solar battery and the amount of charging/discharging electric power produced by a secondary battery are measured with accuracies that can be converted into economic values.

Figures 10, 11:
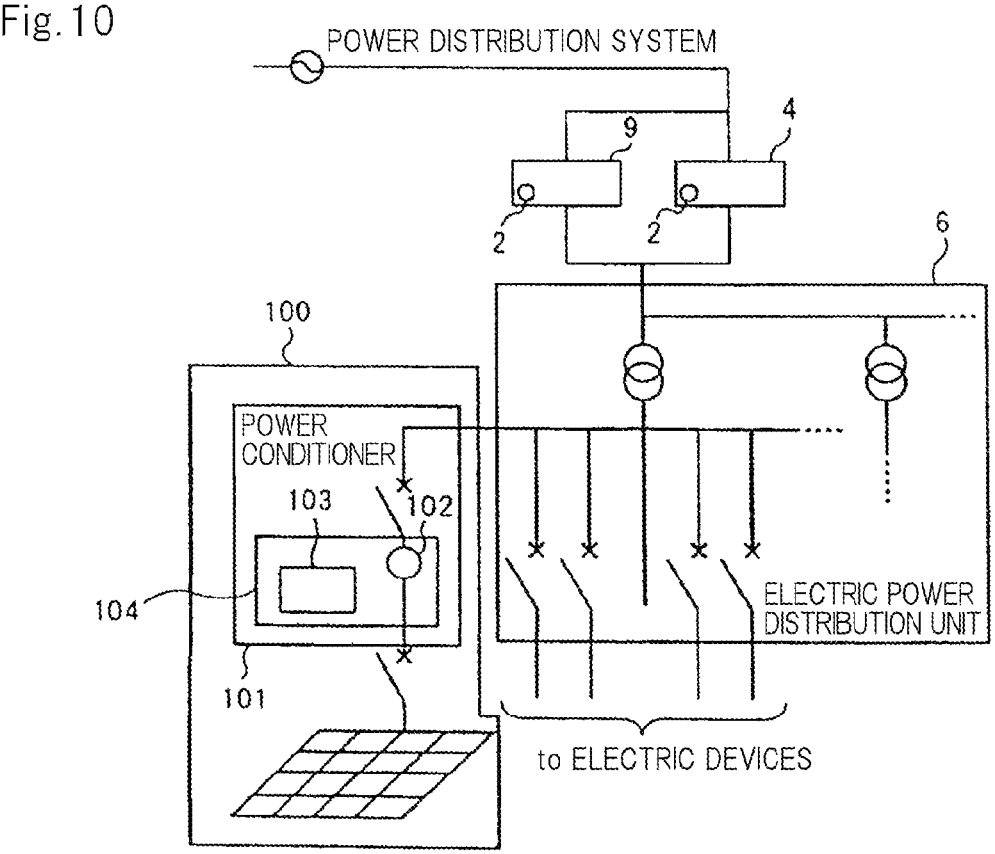
FIG. 10 is a block diagram showing an example of a structure of an electric power measurement system according to a third embodiment.
FIG. 11 is a block diagram showing an example of another structure of the electric power measurement system according to the third embodiment.

As shown in FIG. 10, the electric power measurement system according to the third embodiment is provided with electric power generator 100 that is located indoors and that can supply electric power to a power distribution system that includes a solar battery. The electric power measurement system is also provided with buying electric power meter 4 according to the first embodiment and the second embodiment as an electric power meter that is government certified according to the Measurement Law. The electric power measurement system is also provided with electric power meter that measures electric power that can be sold to the electric company or the like (this electric power meter is referred to as selling electric power meter 9). Since the structure of the electric power measurement system according to the third embodiment is the same as the structure of the electric power measurement system according to the first embodiment or the second embodiment except for the forgoing, its description will be omitted.

Selling electric power meter 9 is an electric power meter that is government certified according to the Measurement Law like buying electric power meter 4. Selling electric power meter 9 is located outdoors and measures electric power that the user of the electric power measurement system according to this embodiment sells to the electric company. Selling electric power meter 9 is also provided with information communication means 2 that transmits the measurement value of the selling electric power to electric power information processing unit 5. Like the first embodiment and the second embodiment, information communication means 2 is a Zigbee radio terminal that uses, for example, a 950 MHz band radio frequency. If a radio communication environment is poor both outdoors and indoors, information communication means 2 of selling electric power meter 9 may be a PLC (Power Line Communication) terminal or the like that uses wired communication. In this case, electric power information processing unit 5 needs to be provided with a PLC terminal.

According to this embodiment, it is assumed that the electric power measurement system shown in FIG. 10 is used in Japan. Thus, selling electric power meter 9 is an electric power meter that measures electric power that is sold having a government certified accuracy according to the Measurement Law. If the electric power measurement system according to this embodiment is used in other than Japan, selling electric power meter 9 may be an electric power meter that measures electric power that is sold having a government certified accuracy according to the laws or standard applied in that particular country or that is sold having an accuracy that can be converted into an economic value designated by the electric company or the like of the particular country. For example, if the electric power measurement system according to this embodiment is used in the United States, selling electric power meter 9 may be a smart meter or the like installed by a utility company in the United States.

Electric power generator 100 is provided with power conditioner 101 that converts DC power generated by a solar battery or the like into AC power that can be supplied to the power distribution system and that controls the generation electric power of the solar battery or the like. Power conditioner 101 is provided with generation electric power measurement unit 104 that has generation electric power detection means 102 that measures the amount of generated electric power and information communication means 103 that transmits a measurement value of generation electric power detection means 102 to electric power information processing unit 5. Electric power detection means 1 of generation electric power measurement unit 104 may be a known electronic type electric power sensor that is provided with an AC current transformer and an AC voltage transformer like the first embodiment and the second embodiment. Information communication means 2 may be a Zigbee radio terminal that uses for example a 950 MHz band radio frequency. Although FIG. 10 exemplifies a solar battery as electric power generator 100, it may be an aerogenerator. As long as electric power generator 100 uses natural energy, electric power generator 100 may be of any type.

When the measurement value of the amount of electric power generated by electric power generator 100 is calibrated by the technique according to the first embodiment or the second embodiment, the amount of generated electric power can be measured with an accuracy that can be converted into an economic value.

Electric power information processing unit 5 according to this embodiment stores the measurement value of the total amount of consumed electric power transmitted from buying electric power meter 4, the measurement value of the amount of electric power generated by generation electric power detection means 102 and the measurement value transmitted from selling electric power meter 9 in every predetermined sampling period. If the difference $\gamma$ of two measurement values of generation electric power detection means 102 is a finite value, the difference $\beta$ that is a finite value of two measurement values of buying electric power meter 4 or selling electric power meter 9 at the corresponding measurement time and $\beta/\gamma$ are calculated and stored. Using the median of a plurality of values of $\beta/\gamma$ obtained in a predetermined measurement period or the median of a predetermined number of values of $\beta/\gamma$, the amount of electric power generated by electric power generator 100 measured by generation electric power detection means 102 is calibrated.

The electric power measurement system according to this embodiment is based on a surplus electric power selling/buying system that supplies electric power generated by electric power generator 100 to each electric device installed indoors, sells surplus electric power to the electric company, and receives electric power from the electric power company if the amount of electric power generated by electric power generator 100 is insufficient. In this system, selling electric power meter 9 measures the amount of surplus electric power, that is generated by electric power generator 100 and that is not used indoors. In addition, since any one of selling electric power meter 9 and buying electric power meter 4 operates, the measurement value of the amount of generated electric power by generation electric power detection means 102 is calibrated using the measurement value of the electric power meter that is operating.

If the amount of electric power generated by electric power generator 100 is denoted by A, the total amount of electric power consumed by each electric device located indoors is denoted by B, the measurement value of selling electric power meter 9 is denoted by C, and the measurement value of buying electric power meter 4 is denoted by D, the following formula can be satisfied.

If there is surplus electric power, the relationship of A−B=C is satisfied.

If there is no surplus electric power, the relationship of B−A=D is satisfied.

These formulas show that in the electric power measurement system according to the third embodiment, the electric power generated by electric power generator 100 becomes a disturbance factor that causes the measurement accuracy of the calibration coefficient $\gamma$ of each electric device 8 to deteriorate.

Thus, if the measurement value of the amount of electric power consumed by each electric device 8 located indoors is calibrated according to the technique presented in the first embodiment or the second embodiment, it is preferred that the measurement value that is obtained at night when the generation electric power A of electric power generator 100 becomes 0 be used. To further improve the calibration accuracy of the measurement value of the amount of electric power consumed by each electric device 8, it may be separately operated. Alternatively, another technique that forces the electric power generator to stop while the amount of electric power consumed by electric devices 8 is being measured. In contrast, to improve the calibration accuracy of the measurement value of the amount of electric power generated by electric power generator 100, a technique that forces each electric device located indoors to stop.

As described above, the electric power measurement systems according to the first embodiment and the second embodiment can estimate $CO_2$ gas emission of each electric device with an accuracy that can be converted into an economic value that allows various services such as carbon footprint, eco-points, environment tax, and carbon credit to be applied. In a demand response program, the contribution of each electric device can be accurately detected. As a result, any contribution to such a program can be accurately awarded.

In addition to these effects, the electric power measurement system according to the third embodiment can obtain the usage and usage ratio of green electric power that is generated as natural energy for each user. In other words, if there is surplus electric power, the value of B or the value of A−C is the usage of the green power. At this point, the usage ratio of the green electric power becomes 100%. In contrast, if there is no surplus electric power, the value of A is the usage of the green electric power. At this point, the usage ratio of the green electric power becomes A/B×100 or A/(A+D)×100.

If a user's house is provided with electric power generator 100, electric power is supplied from the power distribution system of the electric company and electric power generator 100 to each electric device 8 located indoors. Thus, it is difficult to obtain the usage and usage ratio of the green electric power by only using the measurement value C of selling electric power meter 9 and the measurement value D of the buying electric power meter 4 with an accuracy that can be converted into a economic value.

In contrast, the electric power measurement system according to this embodiment accumulates the measurement values (calibration values) of the amount of electric power consumed by each electric device 8 so as to measure the foregoing total consumed electric power B with an accuracy that can be converted into an economic value and also measure generated electric power A of electric power generator 100 with an accuracy that can be converted into an economic value. When the measurement value C and the measurement value D of selling electric power meter 9 and buying electric power meter 4 that are government certified according to the Measurement Law are obtained, the usage and usage ratio of the green electric power for each user can be obtained according to the foregoing formulas.

When the usage and usage ratio of the green electric power for each user can be obtained, even if a price cap system for $CO_2$ gas emission reduction (that designates an upper limit of $CO_2$ gas emission in a predetermined period) is introduced for each user, he or she can deal with such a system.

In addition, the electric power measurement system according to this embodiment can be applied to a structure that has not only electric power generator 100, but also secondary battery 110 that stores electric power generated by electric power generator 100. In this case, secondary battery 110 needs to be provided with electric power measurement unit 113 that has electric power detection means 111 that measures the amount of charging/discharging electric power and information communication means 112 that transmits the measurement value of electric power detection means 111 to electric power information processing unit 5. Like the first embodiment and the second embodiment, electric power detection means 111 of electric power measurement unit 113 may be a known electronic type electric power sensor that has, for example, a current transformer and a voltage transformer. Information communication means 112 may be a Zigbee radio terminal that uses, for example, a 950 MHz band radio frequency.

Since the amount of electric power that is used charge secondary battery 110 may be classified in the same category as the amount of electric power that is consumed by electric device 8, while secondary battery 110 is charging electricity, the measurement value of the electric power sensor (electric power detection means 111) of secondary battery 110 can be calibrated according to the technique presented in the first embodiment or the second embodiment.

In contrast, while secondary battery 110 is discharging electricity, each electric device located indoors is operated in such a manner that electric power is not sold through the power distribution system. The measurement value C of electric power detection means 111 of secondary battery 110 that is discharging electricity is calibrated according to a formula expressed by C=A−B, where A represents the measurement value (calibration value) of the total amount of electric power consumed by the individual electric devices and B represents the measurement value of buying electric power meter 4 that is government certified according to the Measurement Law.

When the measurement value of electric power detection means 111 of secondary battery 110 is calibrated in such a manner, the electric power that is used to charge secondary battery 110 and the electric power that is discharged by secondary battery 110 can be accurately measured and these measurements can be converted into economic values.

With reference to the embodiments, the present invention has been described. However, it should be understood by those skilled in the art that the structure and details of the present invention may be changed in various manners without departing from the scope of the present invention.

The present application is based upon and claims the benefit of priority from Japanese patent application No. 2009-274607 filed on Dec. 2, 2009 and Japanese patent application No. 2010-053117 filed on Mar. 10, 2010, the disclosure of which is incorporated herein in its entirety by reference.

The invention claimed is:

1. A home appliance electric power measurement system, comprising:
    an electric device provided with an electric power measurement unit that has an electric power detector that constantly measures the amount of consumed electric power, a temperature measurement device that measures an ambient temperature of the electric device, and a first information communication transmitter that transmits a measurement value of said electric power detector;
    an electric power meter, which has a second information communication transmitter, that constantly measures a total amount of electric power consumed indoors and transmits the measurement value;
    an electric power generator provided with a generation electric power measurement unit that has a generation electric power detector that measures the amount of generated electric power and a third communication transmitter that transmits a measurement value of said generation electric power detector;
    a selling electric power meter provided with a fourth information communication transmitter that measures surplus electric power of electric power generated by said electric power generator in a predetermined accuracy and transmits the surplus measurement value; and
    an electric power information processing unit that stores the measurement value measured by said electric power detector and transmitted from said electric power measurement unit and the measurement value of said total amount of consumed electric power transmitted from said electric power meter in every predetermined sampling period, and that repetitively calibrates the amount of electric power that is consumed by the electric device and that is measured by the electric power detector based on a difference α of two measurement values that is measured by the electric power detector, based on both a difference β of two measurement values of said electric power meter corresponding to the total amount of electric power consumed indoors and based on β/α; and
    a display device that displays the calibrated amount of the electric power that is consumed by the electric device.

2. The home appliance electric power measurement system according to claim 1, further comprising:
    wherein said electric power information processing unit stores the measurement value measured by said generation electric power detector and transmitted from said generation electric power measurement unit and the measurement value of said surplus electric power transmitted from said selling electric power meter in every predetermined sampling period, when a difference γ of two measurement values of said generation electric power detector is a finite value, calculates and stores both a difference β that is a finite value of two measurement values of said electric power meter or two measurement values of said selling electric power meter corresponding to the two measurement values and β/α, and calibrates the amount of electric power that is generated by said electric power generator and that is measured by said generation electric power detector using a median of a plurality of values of β/α obtained in a predetermined measurement period or a median of a predetermined number of values of β/α.

3. The home appliance electric power measurement system according to claim 2,
wherein when a characteristic detected by said electric power detector is nonlinear, said electric power information processing unit calculates and stores a median of said plurality of values of β/α in each of predetermined measurement electric power ranges of said electric power detector and then calibrates the amount of electric power that is consumed by said electric device and that is measured by said electric power detector using the median of said plurality of values of β/α obtained in each of said measurement electric power ranges.

4. The home appliance electric power measurement system according to claim 2,
wherein said electric power information processing unit calculates and stores a median of said plurality of values of β/α in each of predetermined measurement electric power ranges of said temperature measurement device and then calibrates the amount of electric power that is consumed by said electric device and that is measured by said electric power detector using the median of said plurality of values of β/α obtained in each of said measurement electric power ranges.

5. The home appliance electric power measurement system according to claim 2,
wherein said electric power meter measures said total amount of electric power consumed indoors with an accuracy that can be converted into economic values.

6. The home appliance electric power measurement system according to claim 1,
wherein when a characteristic detected by said electric power detector is nonlinear, said electric power information processing unit calculates and stores a median of said plurality of values of β/α in each of predetermined measurement electric power ranges of said electric power detector and then calibrates the amount of electric power that is consumed by said electric device and that is measured by said electric power detector using the median of said plurality of values of β/α obtained in each of said measurement electric power ranges.

7. The home appliance electric power measurement system according to claim 6,
wherein said electric power information processing unit calculates and stores a median of said plurality of values of β/α in each of predetermined measurement electric power ranges of said temperature measurement device and then calibrates the amount of electric power that is consumed by said electric device and that is measured by said electric power detector using the median of said plurality of values of β/α obtained in each of said measurement electric power ranges.

8. The home appliance electric power measurement system according to claim 6,
wherein said electric power meter measures said total amount of electric power consumed indoors with an accuracy that can be converted into economic values.

9. The home appliance electric power measurement system according to claim 1,
wherein said electric power information processing unit calculates and stores a median of said plurality of values of β/α in each of predetermined measurement electric power ranges of said temperature measurement device and then calibrates the amount of electric power that is consumed by said electric device and that is measured by said electric power detector using the median of said plurality of values of β/α obtained in each of said measurement electric power ranges.

10. The home appliance electric power measurement system according to claim 1,
wherein said electric power meter measures said total amount of electric power consumed indoors with an accuracy that can be converted into economic values.

11. The home appliance electric power measurement system according to claim 1,
wherein said electric power information processing unit calibrates the amount of electric power that is consumed by said electric device and that is measured by said electric power detection means using a median of value of β/α or a median of a predetermined number of values of β/α.

12. A home appliance electric power measurement method, comprising:
providing an electric device, that is a target whose electric power consumption is to be measured, with an electric power measurement unit that has an electric power detector that constantly measures the amount of electric power consumed by the electric device, a temperature measurement device that measures an ambient temperature of the electric device, and a first information communication transmitter that transmits a measurement value of said electric power detector;
providing an electric power meter that constantly measures a total amount of electric power consumed indoors with a second information communication transmitter that transmits the measurement value;
providing an electric power generator provided with a generation electric power measurement unit that has a generation electric power detector that measures the amount of generated electric power and a third information communication transmitter that transmits a measurement value of said generation electric power detector;
providing a selling electric power meter provided with a fourth information communication transmitter that measures surplus electric power of electric power generated by said electric power generator in a predetermined accuracy and transmits the measurement value; and
causing a computer to store the measurement value measured by said electric power detector and transmitted from said electric power measurement unit and the measurement value of said total amount of consumed electric power transmitted from said electric power meter in every predetermined sampling period, and that repetitively calibrates the amount of electric power that is consumed by the electric device and that is measured by the electric power detector based on a difference α of two measurement values that is measured by the electric power detector, based on both a difference β of two measurement values of said electric power meter corresponding to the total amount of electric power consumed indoors and based on β/α; and
displaying the calibrated amount of the electric power that is consumed by the electric device.

13. The home appliance electric power measurement method according to claim 12, further comprising:
causing said computer to store the measurement value measured by said generation electric power detector and transmitted from said generation electric power measurement unit and the measurement value of said amount of surplus electric power transmitted from said selling electric power meter in every predetermined sampling period, when a difference γ of two measurement values of said generation electric power detector is a finite value, calculate and store both a difference β that is a finite value of two measurement values of said electric power meter or two measurement values of said selling electric power meter corresponding to the two measurement values and β/α, and calibrate the amount of electric power that is generated by said electric power generator and that is measured by said generation electric power detector using a median of a plurality of values of β/α obtained in a predetermined measurement period or a median of a predetermined number of values of β/α.

14. The home appliance electric power measurement method according to claim 12, further comprising:
when a characteristic detected by said electric power detector is nonlinear, causing said computer to calculate and store a median of said plurality of values of β/α in each of predetermined measurement electric power ranges of said electric power detector and then calibrate the amount of electric power that is consumed by said electric device and that is measured by said electric power detector using the median of said plurality of values of β/α obtained in each of said measurement electric power ranges.

15. The home appliance electric power measurement method according to claim 12, further comprising:
causing said computer to calculate and store a median of said plurality of values of β/α in each of predetermined measurement electric power ranges of said temperature measurement device and then calibrate the amount of electric power that is consumed by said electric device and that is measured by said electric power detector using the median of said plurality of values of β/α obtained in each of said measurement electric power ranges.

16. The home appliance electric power measurement method according to claim 12,
wherein said electric power meter measures said total amount of electric power consumed indoors with an accuracy that can be converted into economic values.

17. The home appliance electric power measurement method according to claim 12,
wherein said electric power information processing unit calibrates the amount of electric power that is consumed by said electric device and that is measured by said electric power detection means using a median of value of β/α or a median of a predetermined number of values of β/α.

18. An information processing device that calibrates a home appliance electric power measurement value transmitted from an electric device having an electric power measurement unit that includes an electric power detector that measures the amount of consumed electric power, a temperature measurement device that measures an ambient temperature of the electric device, and a first information communication transmitter that transmits the measurement value of said electric power detector, the information processing device comprising:
an information processing device communication transmitter that receives the measurement value measured by said electric power detector and transmitted from said electric power measurement unit and the measurement value of the total amount of electric power consumed indoors, measured in a predetermined accuracy by an electric power meter, and transmitted therefrom;
a processing unit that obtains the measurement value measured by said electric power detector and the measurement value measured by said electric power meter in every predetermined sampling period and that repetitively calibrates the amount of electric power that is consumed by the electric device and that is measured by the electric power detector based on a difference α of two measurement values that is measured by the electric power detector, based on both a difference β of two measurement values of said electric power meter corresponding to the total amount of electric power consumed indoors and based on β/α;
a storage unit that stores both the measurement value measured by said electric power detector and obtained in every said sampling period and the measurement value of said electric power meter and also stores said value of β/α; and
a display device that displays the calibrated amount of the electric power that is consumed by the electric device,
wherein said information communication device receives a measurement value of the amount of electric power generated by an electric power generator from a generation electric power measurement unit that includes a generation electric power detector that measures the amount of generated electric power and a second information communication transmitter that transmits the measurement value of said electric power detector, and a measurement value of the amount of surplus electric power generated by said electric power generator from a selling electric power meter provided with a third information communication transmitter that measures the amount of surplus electric power according to a predetermined accuracy level.

19. The information processing device according to claim 18,
wherein said processing unit obtains the measurement value measured by said generation electric power detector and transmitted from said generation electric power measurement unit and the measurement value of said amount of surplus electric power transmitted from said selling electric power meter in every predetermined sampling period, when a difference γ of two measurement values of said generation electric power detector is a finite value, calculates both a difference β that is a finite value of two measurement values of said electric power meter or two measurement values of said selling electric power meter corresponding to the two measurement values and β/α, and calibrates the amount of electric power that is generated by said electric power generator and that is measured by said generation electric power detector using a median of a plurality of values of β/α obtained in a predetermined measurement period or a median of a predetermined number of values of β/α, and
wherein said storage unit stores both the measurement value measured by said generation electric power detector and obtained in every sampling period and the measurement value of said surplus electric power transmitted from said selling electric power meter and also stores said value of β/α.

20. The information processing device according to claim 18,
wherein when a characteristic detected by said electric power detector is nonlinear, said processing unit calculates and stores a median of said plurality of values of $\beta/\alpha$ in each of predetermined measurement electric power ranges of said electric power detection means and then calibrates the amount of electric power that is consumed by said electric device and that is measured by said electric power detector using the median of said plurality of values of $\beta/\alpha$ obtained in each of said measurement electric power ranges.

21. The information processing device according to claim 18,
wherein said processing unit calculates and stores a median of said plurality of values of $\beta/\alpha$ in each of predetermined measurement electric power ranges of said temperature measurement device and then calibrates the amount of electric power that is consumed by said electric device and that is measured by said electric power detector using the median of said plurality of values of $\beta/\alpha$ obtained in each of said measurement electric power ranges.

22. The information processing device according to claim 18,
wherein said electric power meter measures said total amount of electric power consumed indoors with an accuracy that can be converted into economic values.

23. The information processing device according to claim 18,
wherein said electric power information processing unit calibrates the amount of electric power that is consumed by said electric device and that is measured by said electric power detection means using a median of value of $\beta/\alpha$ or a median of a predetermined number of values of $\beta/\alpha$.

* * * * *